US006563547B1

(12) United States Patent
Smith

(10) Patent No.: US 6,563,547 B1
(45) Date of Patent: May 13, 2003

(54) SYSTEM AND METHOD FOR DISPLAYING A TELEVISION PICTURE WITHIN ANOTHER DISPLAYED IMAGE

(75) Inventor: Kim C. Smith, Colleyville, TX (US)

(73) Assignee: Spotware Technologies, Inc., Poway, CA (US)

(*) Notice: Subject to any disclaimer, the term of this patent is extended or adjusted under 35 U.S.C. 154(b) by 0 days.

(21) Appl. No.: 09/392,441

(22) Filed: Sep. 7, 1999

(51) Int. Cl.$^7$ .................................................. H04N 5/45
(52) U.S. Cl. ........................ 348/565; 348/563; 348/564
(58) Field of Search ................................ 348/563, 569, 348/564, 565, 567; 725/43, 47, 56; 345/788, 783, 807, 800, 840, 779, 719, 720, 781, 835, 771

(56) References Cited

U.S. PATENT DOCUMENTS

| | | | | |
|---|---|---|---|---|
| 5,532,753 A | * | 7/1996 | Buchner et al. ............. 348/569 |
| 5,594,509 A | * | 1/1997 | Florin et al. .................. 348/31 |
| 5,606,374 A | * | 2/1997 | Bertram ....................... 348/565 |
| 5,751,953 A | * | 5/1998 | Shiels et al. .............. 395/200.9 |
| 5,844,620 A | * | 12/1998 | Coleman et al. ............. 348/461 |
| 6,088,064 A | * | 7/2000 | Rumreich et al. ........... 348/564 |
| 6,151,059 A | * | 11/2000 | Schein et al. .................. 348/13 |
| 6,154,771 A | * | 11/2000 | Rangan et al. ............... 709/217 |
| 6,243,142 B1 | * | 6/2001 | Mugura et al. .............. 348/564 |
| 6,313,880 B1 | * | 11/2001 | Smyers et al. .............. 348/552 |
| 6,314,570 B1 | * | 11/2001 | Tanigawa et al. ............. 725/40 |
| 6,348,932 B1 | * | 2/2002 | Nishikawa et al. .......... 345/719 |
| 6,469,753 B1 | * | 10/2002 | Klossterman et al. ........ 348/906 |

* cited by examiner

Primary Examiner—John Miller
Assistant Examiner—Annan Q. Shang
(74) Attorney, Agent, or Firm—Richard Gilly; Mark S. Walker

(57) ABSTRACT

A television screen (24) is displayed as a window (25) within a larger displayed image (21), also referred to as a "picture-in-picture." A control program associated with the window (25) provides additional functions to the window, including the ability to view the time, title, and other information about future programs, in the window (25). A user can switch between various preset lists of channels, and can dynamically edit such lists to add or delete channels. The control program senses the location of a cursor (37) relative to the window (25) and a control region, as defined therein. Depending upon the location of the cursor (37), the window (25) is either in a reduced-size state with fewer controls visible, or in an expanded-size state with greater controls visible.

40 Claims, 5 Drawing Sheets

SYSTEM AND METHOD FOR DISPLAYING A TELEVISION PICTURE WITHIN ANOTHER DISPLAYED IMAGE

FIELD OF THE INVENTION

This invention relates to control programs for display devices and, more particularly, to an enhanced control program and system for displaying television programs and related data in a window within a larger image, or a so-called "picture in picture."

BACKGROUND

Today's televisions are available with certain advanced viewing features. Such features include the so-called "picture-in-picture" (PIP) function, in which a smaller portion of a television screen displays a first selected program within a larger portion of a television screen displaying a second program. This feature allows the user to watch a "main" program in the full screen while monitoring another program in the smaller, PIP window. Although the ability to view two programs simultaneously is helpful, the user generally cannot use the PIP window for much more than monitoring the program displayed therein.

The PIP feature currently thus has limited benefits, which means a user may decide that such benefits are not sufficient to offset the additional costs of the feature. This has the related drawback of making PIP-equipped television sets more difficult to sell.

Another feature available in high-end or advanced television appliances is the display of television program information in a banner across the top or bottom of the screen. A further related feature is the ability to access information about current and future television programs from a so-called "Electronic Program Guide" (EPG) and display it on the television. The available television channels can also be organized by the user into customized "preset lists." These lists allow users to switch or surf among only those channels which are likely to appeal to the user.

There are also examples of television screens being displayed within windows defined in computer monitors. One such system is commercially available under the name WEBTV. The television screen appearing in the computer monitor in such applications is generally only associated with a limited number of controls and only a limited amount of information.

In view of the foregoing, there is a need to make more information, more controls and more features available to users of televisions, and especially features relating to the smaller, PIP window.

This need is all the more pressing as the number of available television channels increases, along with the related programming information.

SUMMARY OF THE INVENTION

In accordance with one aspect of the present invention, a control program displays a television picture within a displayed image, such as one on a computer or other device display. The control program has suitable subroutines to selectively invoke or display the television picture so that it appears within a PIP window of the larger displayed image. The television picture corresponds to a particular television program. Not only is a television program displayed in the window, but information corresponding to the television program is also displayed therein. The control program includes a data structure which contains information about current and future television programs, and another data structure which contains one or more preset channel lists, such lists being composed of subsets of the available channels. Significantly, the control program displays various graphical objects within the window. The graphical objects are linked by the control program to subroutines which allow the data structures to be accessed and which allow corresponding information to be displayed when the graphical objects are selected. For example, activation of suitable graphical objects results in the display of information about current and future television programs. Such information can include the time and title of the current and future programs.

In another aspect of the current invention, the control program operates in conjunction with a computer monitor and the television picture is displayed within whatever screen of data is currently present on the computer display.

In yet another aspect of the current invention, the control program operates in conjunction with a television. The graphical objects include buttons for changing channels, cycling either through the channels of a selected preset list, or through all of the available channels. Other buttons enable the user to add or delete individual channels from the preset lists, while still other buttons allow the user to choose between the available preset lists. Suitable programming creates display fields within the smaller television picture, such as the current channel and program title.

Still another aspect of the present invention allows for the detection of a cursor or other selecting device within the PIP window. The television picture itself is divided into an image area where the televised picture appears, and a tool area, generally containing the aforementioned graphical objects. Suitable programming detects when the cursor is within a predetermined portion of the smaller television screen, and when it is, the tool area expands to include additional graphical objects or display areas, and the image area correspondingly contracts. The control program may also rescale or resize the televised image in the image area so that substantially all of such image fits in the image area irrespective of its size. This concept is further developed in the co-owned and co-filed U.S. Patent Application entitled "Method and System for Displaying Graphical Objects on a Display Screen."

BRIEF DESCRIPTION OF THE DRAWING

The invention will be better understood by reference to the attached drawings. It is understood that the drawings are for illustrative purposes only and is not necessarily drawn to scale. In fact, certain features of the drawing are shown in more detail for purposes of explanation and clarification.

DESCRIPTION OF THE PREFERRED EMBODIMENTS

Figure 1:
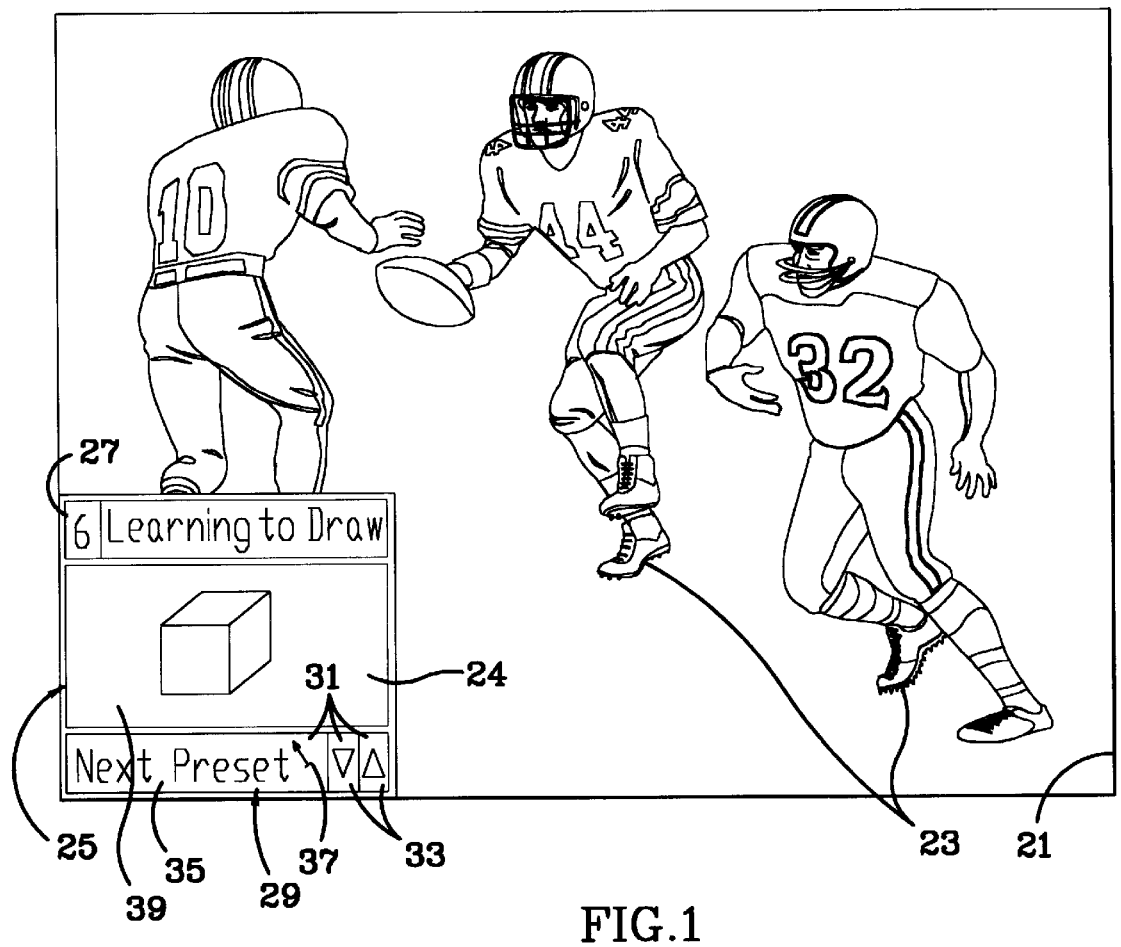
FIG. 1 shows a television display with picture-in-picture capability, in accordance with the current invention.

Referring now to the drawings, FIG. 1 shows a full or main television screen 21 as it may appear on a television set or display system (not shown) displaying images 23 from a corresponding television program, video, or closed-circuit transmission. The television set selectively displays a smaller television screen 24 in a comparably sized window 25, or first region, at the bottom left corner of television screen 21, or second region, thus providing a picture-in-picture ("PIP") capability. Significantly, the control program associated with the PIP feature has been provided with suitable subroutines for displaying in window 25 the currently tuned channel, the title of the corresponding television program, or any other related information, in a display field 27. Although display field 27 is shown in the form of a banner, it can be any other suitable shape at any other suitable location within the window 25. In an effort not to limit the present invention to the broadcasting of television channels, the term "channel" will also be referred to as an audiovisual source, and is meant to encompass various audiovisual source signals, including, but not limited to, television channels, closed-circuit video, DVD signals, etc., and the television picture or image being displayed may also be referred to as the display of an audiovisual signal.

Suitable programming defines a tool area 29 at the bottom of window 25. The tool area includes buttons 31 or other graphical objects corresponding to channel changing controls for television screen 24. More particularly, buttons 31 can be activated by the user, and such activation executes appropriate commands and programming routines to change channels in the case of a television program, to change cameras in the case of a closed-circuit transmission, or to otherwise change the image in window 25 or the signal corresponding to such image. The buttons 31 and corresponding commands in tool area 29 can switch up or down among the available channels, as represented by arrow keys 33. The user can also switch or surf among channels of a previously defined preset list as represented by button 35 labeled "next preset." Selection of buttons 31 is accomplished by means of a cursor or other pointing device 37 and an operatively connected selecting button (not shown).

Figure 2:
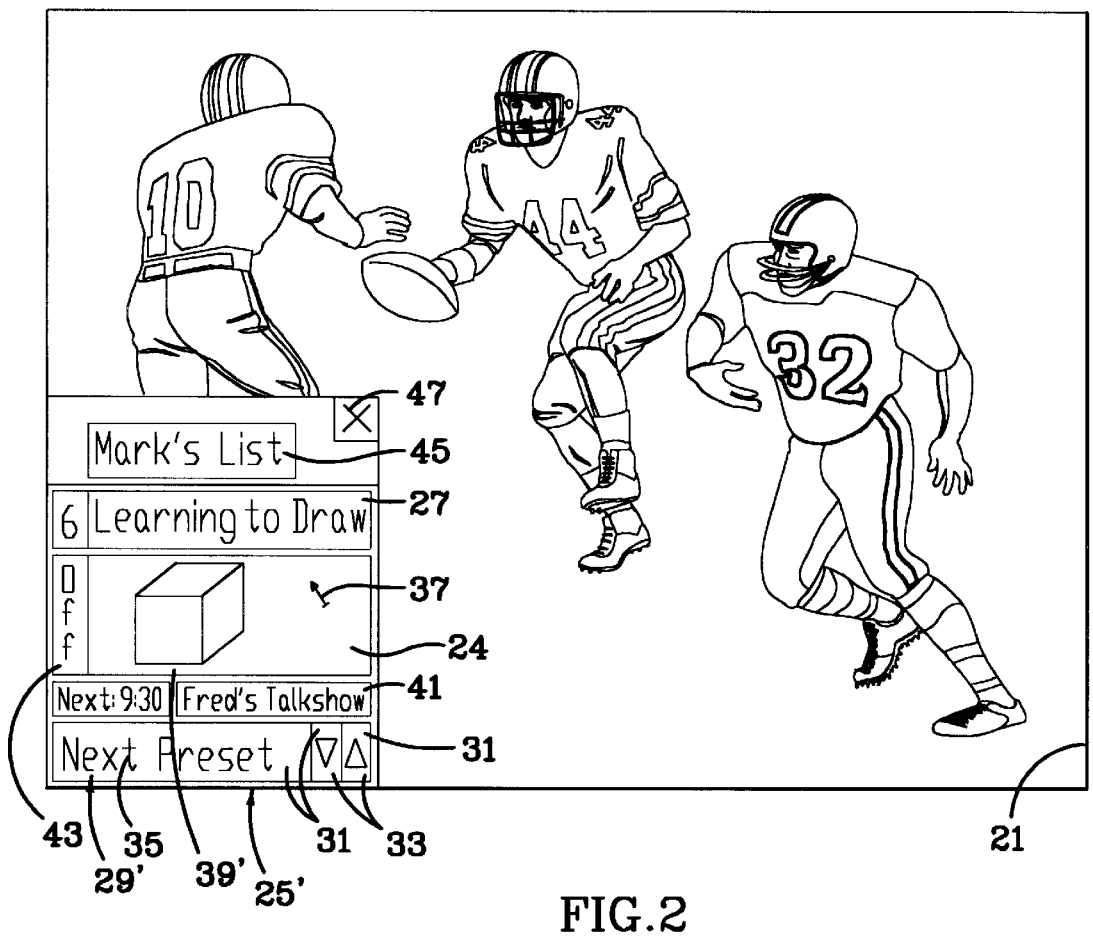
FIG. 2 shows the television display of FIG. 1, with the window being enlarged for additional functionality.

The control program has suitable programming which detects the location of cursor 37 relative to window 25 and the images and objects displayed therein. An image area 39 is defined in smaller television screen 24 and extends between tool area 29 and display field 27. When cursor 37 is outside of window 25 or within tool area 29 as shown in FIG. 1, window 25 has the general size and appearance as shown in FIG. 1. Significantly, when cursor 37 is detected within a predetermined control region of window 25, preferably image area 39, the control program causes window 25 to expand and assume the general appearance shown in FIG. 2, defining an expanded window 25'. In addition, image area 39 (FIG. 1) and the corresponding television picture displayed therein shrinks or reduces to a reduced image area 39' (FIG. 2). The expansion of window 25 and reduction of image area 39 leave room within window 25' for additional graphical objects, display fields, and the like, a preferred arrangement of which is now described.

The control program optionally may include suitable programming for rescaling the television picture displayed in image area 39', so that the complete television picture remains visible (i.e., untruncated), even though now of reduced size. One suitable resealing methodology is disclosed in a copending application having common assignee, as referenced above. The boundary of the control region which expands window 25 need not be restricted to image area 39, but may be located or sized to include other appropriate locations within window 25. Thus, the locations of cursor 37 which will cause window 25 to expand to window 25', or vice versa, may be varied depending on the needs or design preferences of a particular application.

In a preferred embodiment, tool area 29 expands in response to the detection of cursor 37 in image area 39, and a second set of graphical objects are displayed in the additional area of the now expanded tool area 29'. Expanded tool area 29' has an additional display field 41 in which the title and time of the next television program to air on the currently selected channel appear. Optionally, a portion of display field 41 can serve the dual purpose of a button which, when activated, toggles through successive future programs and corresponding times appearing on the selected channel. Tool area 29' also now includes a button 43 for adding channels to and deleting channels from the database of preset lists accessible by the control program. In this embodiment, button 43 is labeled "OFF" as an action to be taken if the currently displayed channel is ON the currently active preset list. In FIG. 2, for example, channel "6" is already ON the preset list, and button 43, if selected, takes channel 6 "OFF" the preset list as indicated by the label on button 43. Adding of channels is accomplished in a similar fashion. When a displayed channel is not in the currently active preset list, button 43 is labeled "ON", and selection of button 43 will put the displayed channel ON the currently active preset list.

Expanded tool area 29' further displays the currently active preset list in a combination display field/button 45 located above display field 27 in this embodiment. Display field/button 45 can be selected by means of cursor 37 and, upon such selection, the control program cycles through the database of available preset lists and displays corresponding indicia in display field/button 45. The availability of multiple preset lists is all the more significant as users are increasingly awash in channel choices. Some of such preset lists may operate in conjunction with an electronic program guide; other lists can be created on the basis of categories, such as sports, movies, news, shopping, children's shows, and the preferences of individual family members. The control program may also create so-called "system lists" which are compiled based on viewing habits of the users, such as a list of the ten most-watched channels, or ten most recently selected channels.

When cursor 37 is moved outside the window 25' in its expanded state, window 25' reassumes its smaller size and configuration as shown in FIG. 1, corresponding to window 25. Another feature of the control program is the ability to reposition window 25 within larger television screen 21 by suitable and well-known clicking and dragging operations. Furthermore, selecting or clicking on image area 39 itself will swap television pictures between the larger screen 21 and smaller window 25.

Any of a variety of additional or different graphical objects and display fields corresponding to control program features can be displayed in tool area 29 or 29'. One such additional feature includes a button 47 which is control programmed to close window 25 when clicked, or otherwise selected or activated. When window 25 is closed, television screen 21 assumes an appearance similar to that shown in FIG. 3, in which the previously displayed window 25 is now activatable by selecting a corresponding button 49. Button 49, in turn, is part of a toolbar 51 which includes other buttons and their corresponding television features. In a preferred embodiment, toolbar 51 is displayed upon detecting a cursor (not shown) in the area to be occupied by toolbar 51. Alternately, instead of a cursor, a dedicated button on a television remote can be used to selectively open and close picture-in-picture window 25.

Figure 4:
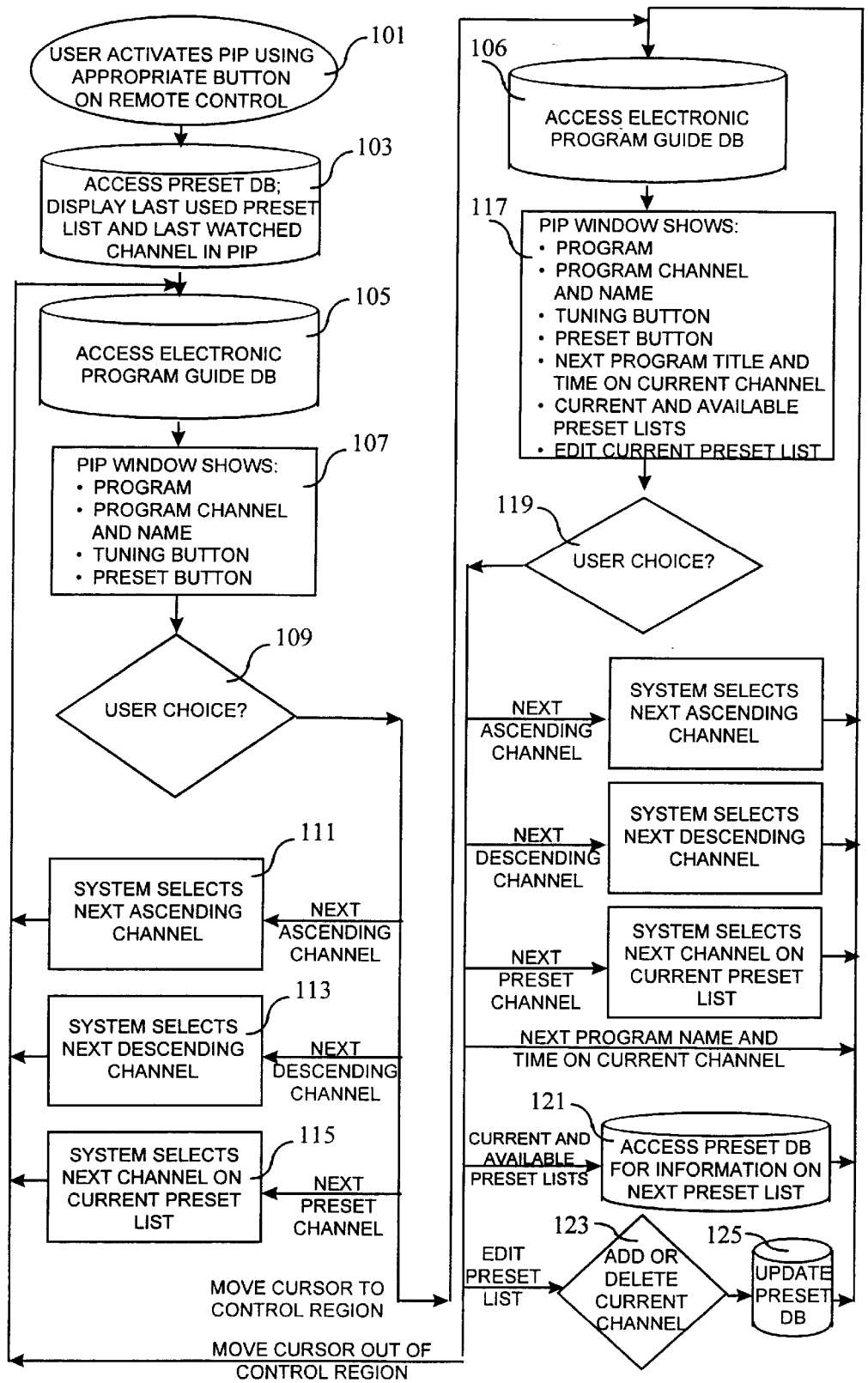
FIG. 4 shows a flowchart of programming logic of the present invention.

The logic of one preferred form of the control program of the present invention is now described with reference to FIG. 4. Starting in start block 101, a user activates the smaller screen or "picture-in-picture" using the appropriate button on a remote control or activating a corresponding graphical object with a cursor. Upon such activation, an access step 103 to the database of preset lists takes place, and the program displays the last used preset list and the last channel watched on the smaller screen. Another database access step 105 occurs thereafter, this time to obtain program and channel information from an electronic program guide. Block 107 shows that the appropriate data from the databases is displayed in the tool area of the smaller screen, the appropriate control buttons are displayed, and the appropriate television picture is displayed in the image area of the smaller screen. The configuration of the smaller screen displayed at block 107 corresponds to the image as shown in FIG. 1.

Once the smaller screen is displayed, the user may choose from among the commands available in the smaller screen, as represented by decision block 109. The user may seek the next ascending or descending channel, the next preset channel, or move the cursor to a control region in the smaller screen, such as the image area. If a channel selection is made, the system displays the appropriate ascending, descending, or preset channel in the smaller screen, as represented by blocks 111, 113, 115, respectively. After such display, access is again made to the electronic program guide database, as shown in block 105, so that the appropriate channel and program information is displayed in the smaller screen.

If the user moves the cursor to the image area or other control region of window 25, then an access step 106 to the electronic program guide occurs, this time to display future program information in the expanded configuration of the smaller screen, as corresponding shown in the image of FIG. 2, and as shown in block 117. As before, the control program continues to display the program itself in the image area, as well as graphical objects and indicia corresponding to the tuned channel, program title, and channel changing buttons. In addition, the window now displays the buttons for the currently active preset list, and for adding or deleting preset channels, and the display includes indicia corresponding to the next program time and title.

The user chooses the desired functions from those displayed in step 117, as represented by decision block 119. In addition to the operations available when the reduced-size window was displayed at block 107, the user, as mentioned above, may see the name and time of the next program on the displayed channel, or may select a button to view still other future programs. The user may cycle through available preset lists, as shown by accessing step 121, which accesses the database of preset lists. When the user wishes to add channels to a given preset list or delete them therefrom, as shown by decision block 123, data is added or deleted from the preset database in the step represented by 125. If the user moves the cursor out of the control area, the smaller screen returns to its reduced size corresponding to block 107, after checking the electronic program guide, block 105, to assure none of the displayed indicia need to be changed.

Figure 3:
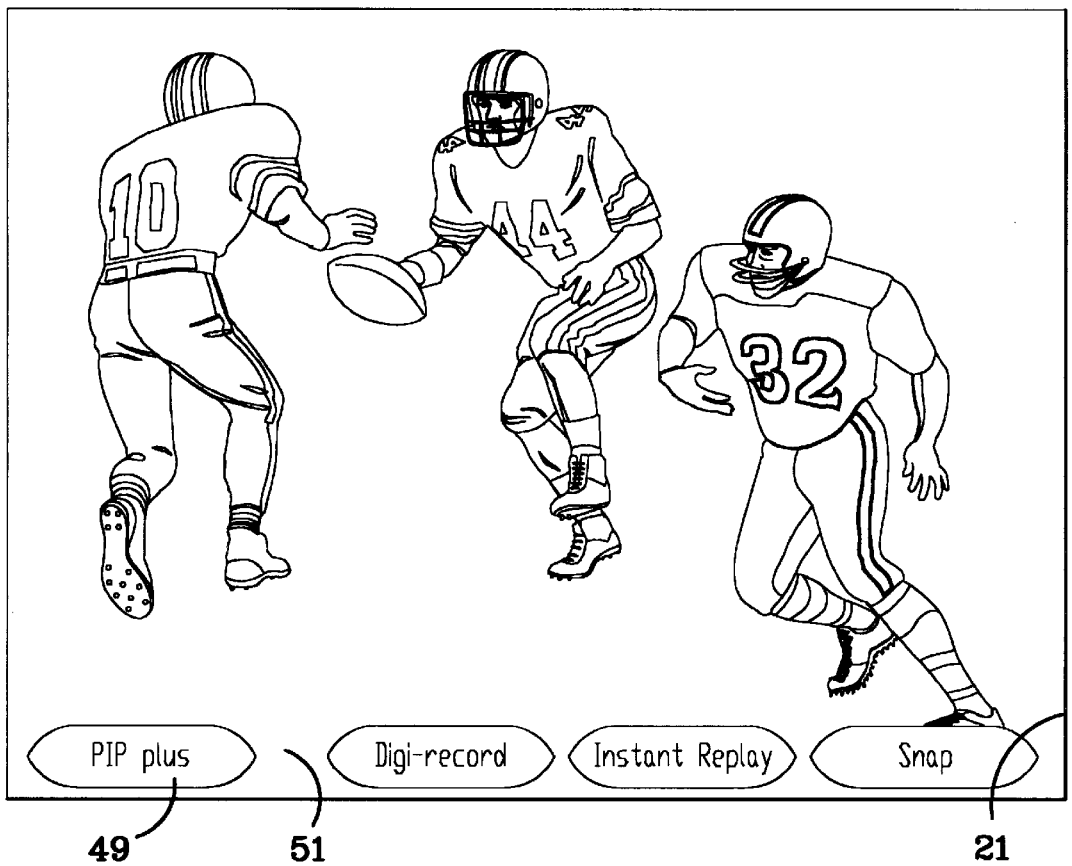
FIG. 3 shows the television display in yet another mode of operation in connection with the picture-in-picture capability of the present invention.
Figure 5:
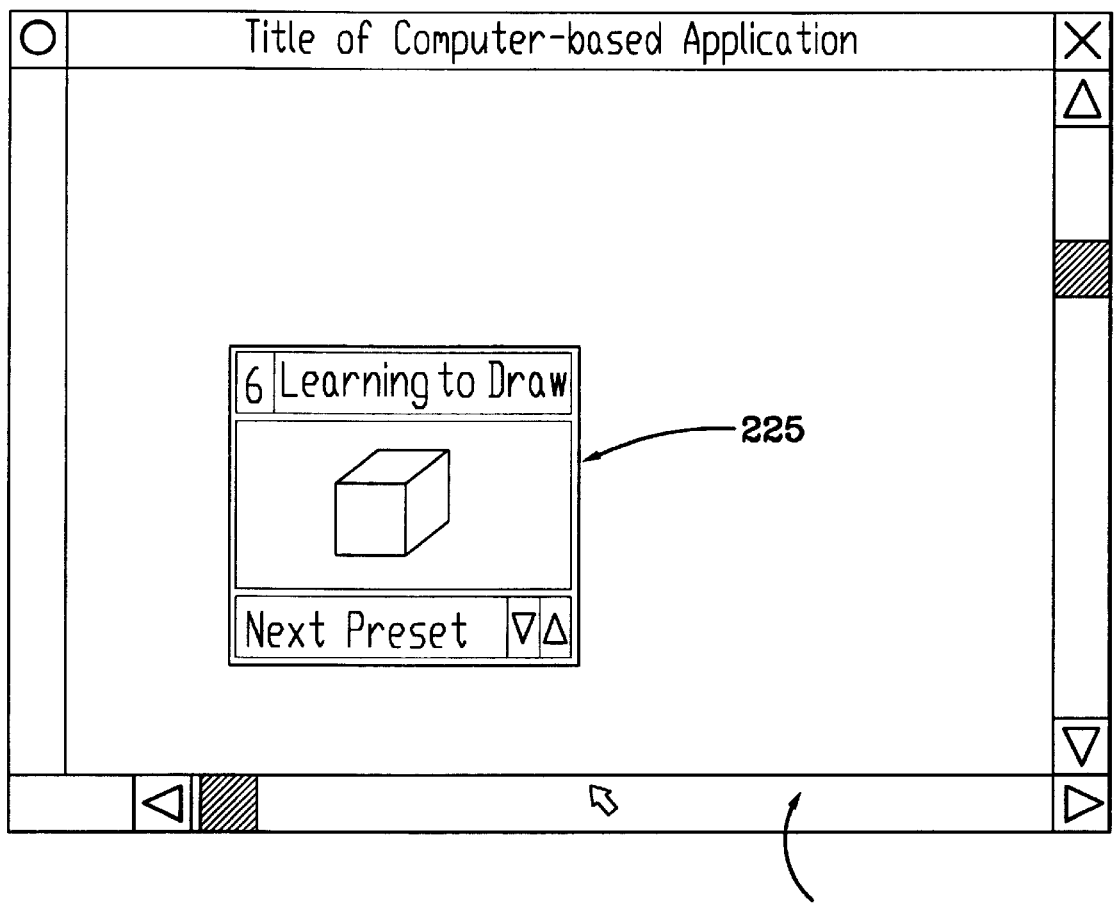
FIG. 5 shows an alternative embodiment of the present invention, in which a television picture is displayed in a computer screen.

The control program and corresponding "picture-in-picture" window 25 and 25' has been shown in FIGS. 1–3 as being displayed within a television screen 21. The picture displayed in either the full screen or the smaller screen can be from a decoded broadcast, cable, video signal from a video cassette player, or other audiovisual source signal. It is also contemplated within the present invention for the control program and picture-in-picture window generated thereby to be "portable" to other display screen environments, such as in a computer monitor or closed-circuit camera system. One such alternative embodiment is shown in FIG. 5, in which a picture-in-picture window 225 displays an audiovisual source signal, while the larger computer screen 221 displays a software application, website, or other graphical display. The display fields and graphical objects, and their corresponding functions, are similar to those described in reference to the previous figures. In a preferred embodiment, selecting of the image area, however, expands the window 225 to the full size of the computer screen 221, rather than switching the television images as in the previous embodiment.

In addition to the advantages apparent from the foregoing description, the control program and picture-in-picture window generated thereby provide an easy-to-use, easy-to-navigate interface to the content displayed in such a feature.

A further advantage of the invention is the display of important additional functions and information in the smaller window, such as the time and title of the next program.

Still another advantage is the ability to edit the channels of a preset list to correspond to any of a variety of parameters or preferences.

Yet another advantage is that such editing can be done dynamically or "on the fly" by toggling a graphical object between two states to add or delete the displayed channel.

It is understood that the above-described preferred embodiments are but a few illustrations of the present invention, and that alternative embodiments may be devised by those of ordinary skill in the art. Such alternatives, as well as others which skill or fancy may suggest, are considered to fall within the scope of the current invention, which is solely defined by the claims appended hereto.

What is claimed is:

1. A system comprising a display having a picture-in-picture capability, in which a first region of the display is capable of displaying a first selected program from available audiovisual sources, and a second region of the display, which is larger than the first region, is capable of displaying a second selected program, the system further comprising:

means for displaying indicia in the first region corresponding to the first selected program;

means for changing the display of the first region from a first audiovisual source to a second audiovisual source;

graphical objects corresponding to the source changing means;

means for displaying the graphical objects in the first region while the first selected program is displayed in said first region; and means for selecting one of the graphical objects to activate the source changing means.

2. The system of claim 1, further comprising means for displaying indicia in the first region corresponding to a future event on the first audiovisual source.

3. The system of claim 1, further comprising means to reposition the location of the first region within the second region.

4. The system of claim 1, further comprising user-activatable means for swapping the display of the first selected program in the first region with the display of the second selected program in the second region.

5. The system of claim 1, wherein the means for displaying indicia corresponding to the first selected program comprise means for determining and displaying a title of the first selected program and a source of the first selected program.

6. The system of claim 2, wherein the means for displaying indicia corresponding to a future event on the first audiovisual source further comprises:
   means for displaying a time and a title of the future event selected from a group consisting of:
      an immediately following future event from the first audiovisual source and one of the future events thereafter from the first audiovisual source; and
      means for selectively displaying in succession the indicia for the immediately following future event and the one of the future events thereafter.

7. A control program for an audiovisual signal appearing as a window within a displayed image, the audiovisual signal corresponding to an audiovisual program selected from available audiovisual programs, the control program comprising:
   means for selectively invoking the audiovisual signal to appear within at least a portion of the displayed image;
   means for selecting the audiovisual program from the available audiovisual programs and displaying the audiovisual program via the audiovisual signal;
   means for displaying indicia in the window corresponding to the audiovisual program therein;
   a data structure comprising information about current and future audiovisual programs;
   means for accessing the data structure;
   user-activatable means for selectively displaying information about any one of the future audiovisual programs as indicia in the window;
   graphical objects corresponding to the selecting means; and
   means for displaying the graphical objects within the window.

8. The control program of claim 7, further comprising means for displaying the audiovisual signal as a window within a display generated by an information handling system.

9. A method for providing a picture within a picture on a display system, the method comprising the following steps:
   displaying a first audiovisual signal in a window within a display of a second audiovisual signal;
   displaying indicia in the window corresponding to the first audiovisual signal;
   displaying a first graphical object in the window capable of changing an audiovisual source from available audiovisual sources for the first audiovisual signal while the first audiovisual signal is being displayed in the window; and
   selecting and activating the first graphical object to change a first audiovisual source for displaying the first audiovisual signal in the window to a different audiovisual source for displaying a different audiovisual signal in the window.

10. The method of claim 9, further comprising the steps of:
    displaying indicia in the window corresponding to a future event on the first audiovisual source.

11. A system comprising a display having a picture-in-picture capability, in which a first region of the display is capable of displaying a first selected program from available audiovisual sources, and a second region of the display, which is larger than the first region, is capable of displaying a second selected program, the system further comprising:
    means for displaying indicia in the first region corresponding to the first selected program, wherein the means for displaying indicia corresponding to the first selected program comprise means for determining and displaying a title of the first selected program and a source of the first selected program;
    means for changing the display of the first region from a first audiovisual source to a second audiovisual source;
    graphical objects corresponding to the source changing means;
    means for displaying the graphical objects in the first region;
    means for selecting one of the graphical objects to activate the source changing means;
    a tool area defined in the first region;
    means for displaying a first subset of the graphical objects in the tool area;
    an image area defined in the first region;
    means for displaying the first selected program in the image area of the first region;
    the selecting means further comprising a cursor movable into, out of, and within the first region;
    means for detecting a location of the cursor;
    means responsive to detection of the cursor within the image area for expanding the size of the tool area and displaying a second subset of the graphical objects therein; and
    means responsive to movement of the cursor from within the image area to without the image area for hiding the second subset of graphical objects and reducing the size of the tool area by an amount corresponding to the increase in size of the tool area for displaying the second subset of graphical objects.

12. The system of claim 11, further comprising:
    means for changing the size of the image area in response to the hiding or displaying of the second subset of graphical objects; and
    means for rescaling an image displayed in the image area to proportionally fill the image area in response to the changing of the size of the image area.

13. A system comprising a display having a picture-in-picture capability, in which a first region of the display is capable of displaying a first selected program from available audiovisual sources, and a second region of the display, which is larger than the first region, is capable of displaying a second selected program, the system further comprising:
    means for displaying indicia in the first region corresponding to the first selected program, wherein the means for displaying indicia corresponding to the first selected program comprise means for determining and displaying a title of the first selected program and a source of the first selected program;
    means for changing the display of the first region from a first audiovisual source to a second audiovisual source;
    graphical objects corresponding to the source changing means;
    means for displaying the graphical objects in the first region;
    means for selecting one of the graphical objects to activate the source changing means;
    a tool area defined in the first region;
    means for displaying a first subset of the graphical objects in the tool area;

an image area defined in the first region;

means for displaying the first selected program in the image area of the first region;

the selecting means further comprising a cursor movable into, out of, and within the first region;

means for detecting a location of the cursor;

means responsive to detection of the cursor within the first region for expanding the size of the tool area and displaying a second subset of the graphical objects therein; and means responsive to movement of the cursor from within the first region to without the first region for hiding the second subset of graphical objects and reducing the size of the tool area by an amount corresponding to the increase in size of the tool area for displaying the second subset of graphical objects.

14. The system of claim 13, further comprising:

means for changing the size of the first region in response to the hiding or displaying of the second subset of graphical objects; and means for rescaling an image displayed in the image area to proportionally fill the image area in response to the changing of the size of the first region.

15. A control program for an audiovisual signal appearing as a window within a displayed image, the audiovisual signal corresponding to an audiovisual program selected from available audiovisual programs, the control program comprising:

means for selectively invoking the audiovisual signal to appear within at least a portion of the displayed image;

means for selecting the audiovisual program from the available audiovisual programs and displaying the audiovisual program via the audiovisual signal;

means for displaying indicia in the window corresponding to the audiovisual program therein;

a data structure comprising information about current and future audiovisual programs;

means for accessing the data structure;

user-activatable means for selectively displaying information about any one of the future audiovisual programs as indicia in the window;

graphical objects corresponding to the selecting means;

means for displaying the graphical objects within the window;

means for displaying a first subset of the graphical objects in a tool area defined in the window and for displaying the audiovisual program in an image area defined in the window;

means for selecting the graphical objects via a cursor movable into, out of, and within the window;

means for detecting a location of the cursor;

means responsive to detection of the cursor within the window for expanding the size of the tool area and displaying a second subset of the graphical objects therein; and means responsive to movement of the cursor from within to without of the window for hiding the second subset of graphical objects and reducing the size of the tool area by an amount corresponding to the increase in size of the tool area displaying the second subset.

16. The control program of claim 15, further comprising:

means for changing the size of the image area in response to the displaying and the hiding of the second subset of graphical objects; and means for rescaling an image displayed in the image area to proportionally fill the image area in response to the changing of the size of the image area.

17. A method for providing a picture within a picture on a display system, the method comprising the following steps:

displaying a first audiovisual signal in a window within a display of a second audiovisual signal;

displaying indicia in the window corresponding to the first audiovisual signal;

automatically displaying a first graphical object in the window capable of changing an audiovisual source from available audiovisual sources for the first audiovisual signal being displayed in the window; and selecting and activating the first graphical object to change a first audiovisual source for displaying the first audiovisual signal in the window to a different audiovisual source for displaying a different audiovisual signal in the window.

18. The method of claim 17, further comprising the steps of:

displaying indicia in the window corresponding to a future event on the first audiovisual source.

19. A system comprising a display having a picture-in-picture capability, in which a first region of the display is capable of displaying a first selected program from available audiovisual sources, and a second region of the display, which is larger than the first region, is capable of displaying a second selected program, the system further comprising:

means for displaying indicia in the first region corresponding to the first selected program;

means for changing the display of the first region from a first audiovisual source to a second audiovisual source;

graphical objects corresponding to the source changing means;

means for displaying the graphical objects in the first region while the first selected program is displayed in said first region; and means for selecting one of the graphical objects to activate the source changing means;

means for establishing at least one preset list comprising a subset of the available audiovisual sources;

means for switching between the audiovisual sources of the preset list;

graphical objects corresponding to the establishing means and the switching means;

means for displaying the graphical objects in the first region; and the selecting means being capable of selecting one of the graphical objects to activate one of the establishing means or switching means.

20. The system of claim 19, wherein the establishing means includes means to add individual audiovisual sources to the subset and to delete individual audiovisual sources from the subset.

21. The system of claim 19, wherein the establishing means further comprises means for establishing a first preset list corresponding to a first user's audiovisual source preferences, and a second preset list different from the first preset list;

the selecting means further being capable of selecting between the first preset list and the second preset list; and graphical objects corresponding to a selection of the first preset list and the second preset list capable of being displayed in the first region.

22. A system comprising a display having a picture-in-picture capability, in which a first region of the display is capable of displaying a first selected program from available audiovisual sources, and a second region of the display, which is larger than the first region, is capable of displaying a second selected program, the system further comprising:
  means for displaying indicia in the first region corresponding to the first selected program, wherein the means for displaying indicia corresponding to the first selected program comprise means for determining and displaying a title of the first selected program and a source of the first selected program;
  means for changing the display of the first region from a first audiovisual source to a second audiovisual source;
  graphical objects corresponding to the source changing means;
  means for displaying the graphical objects in the first region while the first selected program is displayed in said first region;
  means for selecting one of the graphical objects to activate the source changing means, wherein the means for selecting further comprises a cursor movable into, out of, and within the first region;
  a tool area defined in the first region;
  means for displaying a first subset of the graphical objects in the tool area;
  an image area defined in the first region; and
  means for displaying the first selected program in the image area of the first region.

23. The system of claim 22, further comprising:
  means for detecting a location of the cursor;
  means responsive to detection of the cursor within the image area for expanding the size of the tool area and displaying a second subset of the graphical objects therein; and
  means responsive to movement of the cursor from within the image area to without the image area for hiding the second subset of graphical objects and reducing the size of the tool area by an amount corresponding to the increase in size of the tool area for displaying the second subset of graphical objects.

24. The system of claim 23, further comprising:
  means for changing the size of the image area in response to the hiding or displaying of the second subset of graphical objects; and
  means for rescaling an image displayed in the image area to proportionally fill the image area in response to the changing of the size of the image area.

25. The system of claim 21, further comprising:
  means for detecting a location of the cursor;
  means responsive to detection of the cursor within the first region for expanding the size of the tool area and displaying a second subset of the graphical objects therein; and means responsive to movement of the cursor from within the first region to without the first region for hiding the second subset of graphical objects and reducing the size of the tool area by an amount corresponding to the increase in size of the tool area for displaying the second subset of graphical objects.

26. The system of claim 25, further comprising:
  means for changing the size of the first region in response to the hiding or displaying of the second subset of graphical objects; and
  means for resealing an image displayed in the image area to proportionally fill the image area in response to the changing of the size of the first region.

27. A control program for an audiovisual signal appearing as a window within a displayed image, the audiovisual signal corresponding to an audiovisual program selected from available audiovisual programs, the control program comprising:
  means for selectively invoking the audiovisual signal to appear within at least a portion of the displayed image;
  means for displaying indicia in the window corresponding to the audiovisual program therein;
  a data structure comprising information about current and future audiovisual programs;
  means for accessing the data structure;
  user-activatable means for selectively displaying information about any one of the future audiovisual programs as indicia in the window;
  graphical objects corresponding to the selecting means;
  means for selecting the audiovisual program from the available audiovisual programs and displaying the audiovisual program via the audiovisual signal, wherein the means for selecting are capable of selecting one of the graphical objects to activate one of the establishing means or switching means;
  means for displaying the graphical objects within the window;
  means for establishing at least one preset list comprising a subset of the available audiovisual programs;
  means for switching between the audiovisual programs of the preset list;
  graphical objects corresponding to the establishing means and the switching means;
  means for displaying the graphical objects within the television picture; and
  means for displaying the graphical objects in the window.

28. A control program for an audiovisual signal appearing as a window within a displayed image, the audiovisual signal corresponding to an audiovisual program selected from available audiovisual programs, the control program comprising:
  means for selectively invoking the audiovisual signal to appear within at least a portion of the displayed image;
  means for selecting the audiovisual program from the available audiovisual programs and displaying the audiovisual program via the audiovisual signal;
  means for displaying indicia in the window corresponding to the audiovisual program therein;
  a data structure comprising information about current and future audiovisual programs;
  means for accessing the data structure;
  user-activatable means for selectively displaying information about any one of the future audiovisual programs as indicia in the window;
  graphical objects corresponding to the selecting means;
  means for displaying the graphical objects within the window;
  means for displaying a first subset of the graphical objects in a tool area defined in the window and for displaying the audiovisual program in an image area defined in the window; and
  means for selecting the graphical objects via a cursor movable into, out of, and within the window.

29. The control program of claim 28, further comprising:
  means for detecting a location of the cursor;
  means responsive to detection of the cursor within the window for expanding the size of the tool area and displaying a second subset of the graphical objects therein; and means responsive to movement of the cursor from within to without of the window for hiding the second subset of graphical objects and reducing the size of the tool area by an amount corresponding to the increase in size of the tool area displaying the second subset.

30. The control program of claim 29, further comprising:

means for changing the size of the image area in response to the displaying and the hiding of the second subset of graphical objects; and means for rescaling an image displayed in the image area to proportionally fill the image area in response to the changing of the size of the image area.

31. A method for providing a picture within a picture on a display system, the method comprising the following steps:

displaying a first audiovisual signal in a window within a display of a second audiovisual signal;

displaying indicia in the window corresponding to the first audiovisual signal;

displaying a first graphical object in the window capable of changing an audiovisual source from available audiovisual sources for the first audiovisual signal while the first audiovisual signal is being displayed in the window;

selecting and activating the first graphical object to change a first audiovisual source for displaying the first audiovisual signal in the window to a different audiovisual source for displaying a different audiovisual signal in the window;

establishing at least one preset list comprising a subset of the available audiovisual sources; and switching between the audiovisual sources of the preset list.

32. The method of claim 31, further comprising the steps of:

adding individual audiovisual sources to the subset and deleting individual audiovisual sources from the subset.

33. A method for providing a picture within a picture on a display system, the method comprising the following steps:

displaying a first audiovisual signal in a window within a display of a second audiovisual signal;

displaying indicia in the window corresponding to the first audiovisual signal;

displaying a first graphical object in the window capable of changing an audiovisual source from available audiovisual sources for the first audiovisual signal while the first audiovisual signal is being displayed in the window;

selecting and activating the first graphical object to change a first audiovisual source for displaying the first audiovisual signal in the window to a different audiovisual source for displaying a different audiovisual signal in the window;

establishing a first preset list corresponding to a first user's audiovisual source preferences, and a second preset list different from the first preset list; and selecting between the first preset list and the second preset list.

34. A method for providing a picture within a picture on a display system, the method comprising the following steps:

displaying a first audiovisual signal in a window within a display of a second audiovisual signal;

displaying indicia in the window corresponding to the first audiovisual signal;

automatically displaying a first graphical object in the window capable of changing an audiovisual source from available audiovisual sources for the first audiovisual signal being displayed in the window;

selecting and activating the first graphical object to change a first audiovisual source for displaying the first audiovisual signal in the window to a different audiovisual source for displaying a different audiovisual signal in the window;

establishing at least one preset list comprising a subset of the available audiovisual sources; and switching between the audiovisual sources of the preset list.

35. The method of claim 34, further comprising the steps of:

adding individual audiovisual sources to the subset and deleting individual audiovisual sources from the subset.

36. A method for providing a picture within a picture on a display system, the method comprising the following steps:

displaying a first audiovisual signal in a window within a display of a second audiovisual signal;

displaying indicia in the window corresponding to the first audiovisual signal;

automatically displaying a first graphical object in the window capable of changing an audiovisual source from available audiovisual sources for the first audiovisual signal being displayed in the window;

selecting and activating the first graphical object to change a first audiovisual source for displaying the first audiovisual signal in the window to a different audiovisual source for displaying a different audiovisual signal in the window;

establishing a first preset list corresponding to a first user's audiovisual source preferences, and a second preset list different from the first preset list; and selecting between the first preset list and the second preset list.

37. A system comprising a display having a picture-in-picture capability, in which a first region of the display is capable of displaying a first selected program from available audiovisual sources, and a second region of the display, which is larger than the first region, is capable of displaying a second selected program, the system further comprising:

means for displaying indicia in the first region corresponding to the first selected program;

means for changing the display of the first region from a first audiovisual source to a second audiovisual source;

graphical objects corresponding to the source changing means;

means for displaying the graphical objects in the first region while the first selected program is displayed in said first region;

means for maintaining display of the graphical objects both before and after changing the display of the first region; and means for selecting one of the graphical objects to activate the source changing means.

38. A control program for an audiovisual signal appearing as a window within a displayed image, the audiovisual signal corresponding to an audiovisual program selected from available audiovisual programs, the control program comprising:

means for selectively invoking the audiovisual signal to appear within at least a portion of the displayed image;

means for selecting the audiovisual program from the available audiovisual programs and displaying the audiovisual program via the audiovisual signal;

means for displaying indicia in the window corresponding to the audiovisual program therein;

a data structure comprising information about current and future audiovisual programs;

means for accessing the data structure;

user-activatable means for selectively displaying information about any one of the future audiovisual programs as indicia in the window;

graphical objects corresponding to the selecting means;

means for displaying the graphical objects within the window; and means for maintaining display of the graphical objects both before and after selecting the audiovisual program.

39. A method for providing a picture within a picture on a display system, the method comprising the following steps:

displaying a first audiovisual signal in a window within a display of a second audiovisual signal;

displaying indicia in the window corresponding to the first audiovisual signal;

displaying a first graphical object in the window capable of changing an audiovisual source from available audiovisual sources for the first audiovisual signal while the first audiovisual signal is being displayed in the window;

selecting and activating the first graphical object to change a first audiovisual source for displaying the first audiovisual signal in the window to a different audiovisual source for displaying a different audiovisual signal in the window; and maintaining display of the graphical objects both before and after changing the audiovisual source.

40. A method for providing a picture within a picture on a display system, the method comprising the following steps:

displaying a first audiovisual signal in a window within a display of a second audiovisual signal;

displaying indicia in the window corresponding to the first audiovisual signal;

automatically displaying a first graphical object in the window capable of changing an audiovisual source from available audiovisual sources for the first audiovisual signal being displayed in the window;

maintaining display of the first graphical object both before and after changing the audiovisual source; and selecting and activating the first graphical object to change a first audiovisual source for displaying the first audiovisual signal in the window to a different audiovisual source for displaying a different audiovisual signal in the window.

* * * * *